US012693149B2

(12) United States Patent
    Lee

(10) Patent No.: US 12,693,149 B2
(45) Date of Patent: Jul. 28, 2026

(54) WATER LEVEL MEASUREMENT SYSTEM

(71) Applicant: KOREA HYDRO & NUCLEAR POWER CO., LTD., Gyeongju-si (KR)

(72) Inventor: Seung Chan Lee, Daejeon (KR)

(73) Assignee: KOREA HYDRO & NUCLEAR POWER. CO., LTD., Gyeongju-si (KR)

( * ) Notice: Subject to any disclaimer, the term of this patent is extended or adjusted under 35 U.S.C. 154(b) by 330 days.

(21) Appl. No.: 18/029,165

(22) PCT Filed: Sep. 27, 2021

(86) PCT No.: PCT/KR2021/013163
    § 371 (c)(1),
    (2) Date: Mar. 29, 2023

(87) PCT Pub. No.: WO2022/071706
    PCT Pub. Date: Apr. 7, 2022

(65) Prior Publication Data
    US 2023/0366718 A1    Nov. 16, 2023

(30) Foreign Application Priority Data

Sep. 29, 2020    (KR) ........................ 10-2020-0127325

(51) Int. Cl.
    *G01F 23/296*        (2022.01)
(52) U.S. Cl.
    CPC ................................ *G01F 23/2961* (2013.01)
(58) Field of Classification Search
    CPC ................................................ G01F 23/2961
    See application file for complete search history.

(56) References Cited

U.S. PATENT DOCUMENTS 3,851,333 A * 11/1974 Fishman ............. G01F 23/2965
                                                      73/290 V
4,063,457 A * 12/1977 Zekulin ............... G01F 23/2961
                                                      367/908
5,697,248 A * 12/1997 Brown .................... G01F 23/28
                                                      73/290 V (Continued)

FOREIGN PATENT DOCUMENTS

CN        104215300        12/2014
CN        105387910        3/2016

(Continued)

OTHER PUBLICATIONS

EPO, Search Report of EP 21875981.9 dated Oct. 18, 2024, total 8 pages.

*Primary Examiner* — John E Breene
*Assistant Examiner* — Alex T Devito
(74) *Attorney, Agent, or Firm* — LEX IP MEISTER, PLLC

(57) ABSTRACT

A water level measurement system according to an embodiment includes a support pipe installed in a water tank filled with a fluid to measure a water level and extending in a depth direction of the water tank, a support rod disposed on one side of the support pipe based on a central axis of the support pipe and extending in the depth direction of the water tank, a plurality of ultrasonic probes attached to the support rod and generating ultrasonic waves, and a water level calculator connected to the plurality of ultrasonic probes and calculating the water level of the water tank.

7 Claims, 4 Drawing Sheets

(56)         References Cited

U.S. PATENT DOCUMENTS

| | | | |
|---|---|---|---|
| 2004/0144170 A1 * | 7/2004 | Senibi ................. | G01F 23/2962 |
| | | | 73/290 V |
| 2010/0132453 A1 | 6/2010 | Dam | |
| 2014/0260521 A1 | 9/2014 | Mcqueen et al. | |
| 2014/0338443 A1 * | 11/2014 | Birtcher ............. | G01F 23/2961 |
| | | | 73/290 V |
| 2015/0177045 A1 * | 6/2015 | Cobianu ............ | G01F 23/2961 |
| | | | 367/99 |

FOREIGN PATENT DOCUMENTS

| | | | | |
|---|---|---|---|---|
| GB | 2312509 | 10/1997 | | |
| JP | S56130616 | 10/1981 | | |
| JP | 2010-276593 | 12/2010 | | |
| JP | 2013-140029 | 7/2013 | | |
| JP | 2014-224818 | 12/2014 | | |
| KR | 10-2011-0116747 | 10/2011 | | |
| KR | 10-2014-0094715 | 7/2014 | | |
| KR | 20140094715 A * | 7/2014 | ......... | G01F 23/0046 |
| KR | 2016-0026733 | 3/2016 | | |
| WO | 03/012379 | 2/2003 | | |

* cited by examiner

WATER LEVEL MEASUREMENT SYSTEM

TECHNICAL FIELD

The present invention relates to a water level measurement system, and more particularly, to a water level measurement system using ultrasonic waves.

BACKGROUND ART

In general, the level of cooling water filled inside a nuclear fuel reloading tank or a nuclear fuel storage tank of a nuclear power plant is monitored, and a safety response system and procedure should be prepared accordingly. That is, in the nuclear fuel reloading tank or the nuclear fuel storage tank, the cooling process is performed for the decay heat, and the forced cooling by a pump is performed. At this time, in the case of the nuclear fuel storage tank, when the cooling function is lost or the forced circulation is not performed, the fuel storage storage tank boils and then the steam may be mixed. At this time, the water level must be monitored so that an alternative water source can be mobilized immediately, and the condition thereof must be monitored through continuous water level monitoring even after the alternative water source is fed into the water.

In general, a water level measurement method of a differential pressure type or a water level measurement method of an ultrasonic wave type is used to measure the water level. In the water level measurement method of the differential pressure type, when bubbles or steam are generated inside the water tank, it is difficult to measure the water level by differential pressure due to rapid fluctuations of the fluid. The water level measurement method of the ultrasonic wave measures the water level by calculating the time between ultrasonic waves emitted and ultrasonic waves reflected in a dense medium such as a liquid or by using an interference fringe of the ultrasonic waves. The water level measurement method of the ultrasonic wave is highly correlated with the presence of reflected waves reflected after the ultrasonic waves are transmitted through the dense medium. When conditions are not normal, that is, when the cooling function of the nuclear fuel reloading tank or the nuclear fuel storage tank is lost, the boiling occurs in the cooling water, and bubbles or steam are rapidly generated, it is difficult to calculate a standardized reflected wave because the reflected wave is extinguished or lost. Therefore, it is difficult to accurately measure the reflected wave, and there is a limit to measuring the water level. In particular, when the bubbles are generated, it is difficult to accurately measure the water level because the waveform of the ultrasonic wave is uneven.

In order to supplement these water level measurement methods, a thermal contact radar method, a thermal diffusion radar method, or a method of measuring the water level by imitating the shape of a radar are used, but in these methods, complex modules or equipment for analysis and interpretation are combined an equipment for analyzing radar-type data must be installed, so the price and cost of the equipment itself increases.

DISCLOSURE

Technical Problem

The present embodiment relates to a water level measurement system capable of accurately measuring a water level even under abnormal conditions.

Technical Solution

A water level measurement system according to an embodiment includes a support pipe installed in a water tank filled with a fluid to measure a water level and extending in a depth direction of the water tank, a support rod disposed on one side of the support pipe based on a central axis of the support pipe and extending in the depth direction of the water tank, a plurality of ultrasonic probes attached to the support rod and generating ultrasonic waves, and a water level calculator connected to the plurality of ultrasonic probes and calculating the water level of the water tank.

The support rod may be in contact with an inner wall of the support pipe.

The ultrasonic probe may be installed at a position facing an exposed inner wall of the support pipe.

The plurality of ultrasonic probes may propagate the ultrasonic wave in a horizontal direction parallel to a surface of the fluid.

The water level calculator may calculate the water level of the water tank by using a number of ultrasonic probes that have detected signals of reflected waves reflected from the support pipe among the plurality of ultrasonic probes.

When the number of the plurality of ultrasonic probes is N, a length of the support rod is L, and the number of ultrasonic probes detecting the signal of the reflected wave is S, the water level in the water tank is calculated as $(L/N)*S$.

The plurality of ultrasonic probes may be disposed in the depth direction of the water tank.

The water level measurement system may further a fixing member fixing the ultrasonic probe to the support rod.

The water tank may include a nuclear fuel reloading tank or a nuclear fuel storage tank of a nuclear power plant.

Advantageous Effects

According to an embodiment, since ultrasonic waves propagate a space between the support rod and the inner wall of the support pipe, where bubbles or steam are not generated, the water level can be accurately measured even under abnormal conditions in which bubbles or steam are generated inside the water tank.

In addition, since the water level of the fluid filled in the water tank can be measured using an ultrasonic probe, which is a low-cost apparatus, the water level can be quickly measured at a low cost compared to a method using expensive radar-type equipment.

MODE FOR INVENTION

Figure 1:
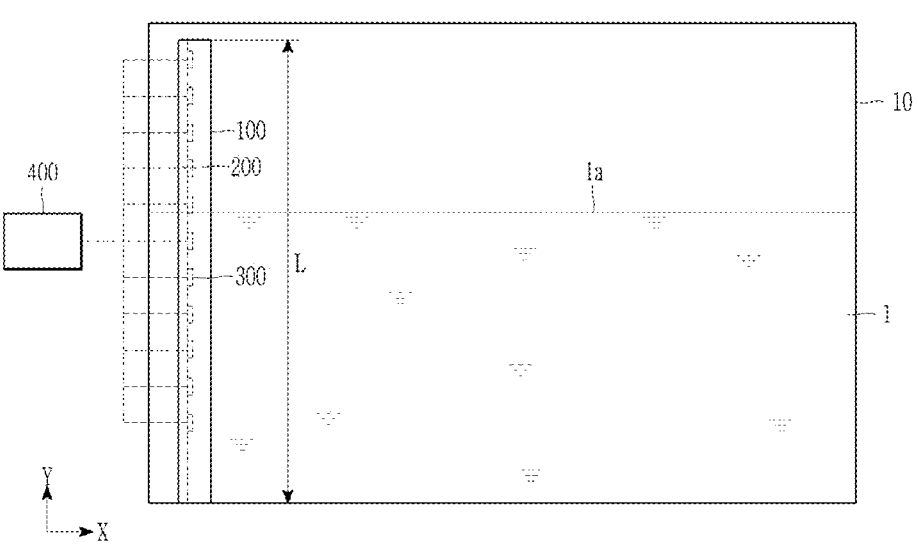
FIG. 1 is a drawing schematically illustrating a state in which a water level measurement system according to an embodiment is installed in a water tank.

Hereinafter, in order to aid understanding of the present invention, various embodiments of the present invention will be described in detail so that those skilled in the art can easily carry out the present invention with reference to the accompanying drawings. The present disclosure may be embodied in many different forms and is not limited to the embodiments described herein.

In order to clearly illustrate the present disclosure, parts that are not related to the description are omitted, and the same or similar constituent elements are given the same reference numerals throughout the specification.

In addition, since the size and thickness of each configuration shown in the drawing are arbitrarily shown for better understanding and ease of description, the present disclosure is not necessarily limited to the illustrated one.

Figure 2:
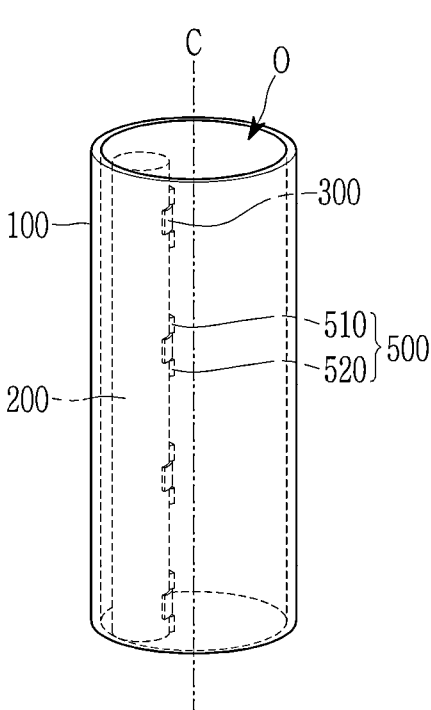
FIG. 2 is a partial perspective view of a water level measurement system according to an embodiment.
Figure 3:
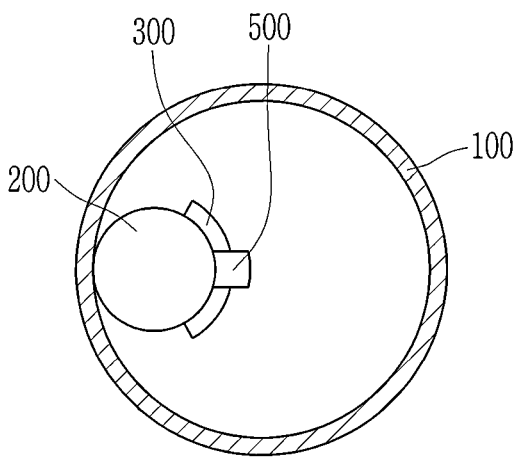
FIG. 3 is a plan view of a water level measurement system according to one embodiment.

FIG. 1 is a drawing schematically illustrating a state in which a water level measurement system according to an embodiment is installed in a water tank, FIG. 2 is a partial perspective view of a water level measurement system according to an embodiment, and FIG. 3 is a plan view of a water level measurement according to an embodiment.

As shown in FIG. 1, the water level measurement system according to an embodiment includes a support pipe 100, a support rod 200, a plurality of ultrasonic probes 300, a water level calculator 400, and a plurality of fixing members 500.

The support pipe 100 may be installed in the water tank 10 filled with the fluid 1 to measure the water level. The support pipe 100 may extend long in the depth direction Y of the water tank 10 and may have a predetermined length L. The support pipe 100 may have a lower portion disposed below a water surface 1a of the fluid 1 filled in the water tank 10 and an upper portion disposed above the water surface 1a of the fluid 1. Thus, the fluid 1 may be filled in the inner space O of the support pipe 100. The support pipe 100 may be made of a material such as metal. The water tank 10 may include a nuclear fuel reloading tank or a nuclear fuel storage tank of a nuclear power plant. Therefore, the present invention can monitor the water level of the cooling water filled inside the water tank 10 of the nuclear power plant. However, the present invention is not necessarily limited thereto and can be applied to various water tanks.

The support rod 200 may be disposed in the inner space O of the support pipe 100. The support rod 200 may be disposed on one side of the support pipe 100 based on the central axis C of the support pipe 100 and may extend in the depth direction Y. The length L of the support rod 200 may be the same as the length L of the support pipe 100. However, it is not necessarily limited thereto, and the length L of the support rod 200 may be different from the length L of the support pipe 100 according to the embodiment. The support rod 200 may be disposed on one side of the support pipe 100 in contact with the inner wall of the support pipe 100. Therefore, the fluid 1 may be disposed in a narrow inner space O between the inner wall of the support pipe 100 and the support rod 200. Therefore, even under abnormal conditions in which boiling occurs in the water tank 10 and bubbles or steam are generated, bubbles or steam hard to exist in the fluid 1 disposed in the narrow space between the inner wall of the support pipe 100 and the support rod 200.

A plurality of ultrasonic probes 300 may be attached to a circumferential surface of the support rod 200 to generate ultrasonic waves L1 and L2 and may detect a reflected wave R. Also, the plurality of ultrasonic probes 300 may propagate the ultrasonic waves in a horizontal direction X parallel to the surface 1a of the fluid 1. Therefore, ultrasonic waves generated by the plurality of ultrasonic probes 300 may propagate to the inner wall of the support pipe 100. At this time, since it is difficult for bubbles or steam to exist on the path of ultrasonic waves, the water level may be accurately measured.

The plurality of ultrasonic probes 300 may be spaced apart at predetermined gap in the depth direction Y of the water tank 10.

The ultrasonic probe 300 may be installed on the circumferential surface of the support rod 200 at a position facing the exposed inner wall of the support pipe 100. Therefore, the ultrasonic waves can be generated in one direction from the support rod 200.

At this time, the side wall to which the plurality of ultrasonic probes 300 are attached among the side walls of the filled support rod 200 may not directly contact the inner wall of the support pipe 100 facing the same each other and may have a structure separated from each other. Therefore, the vibration of ultrasonic waves generated from the plurality of ultrasonic probes 300 attached to the support rod 200 may not directly affect the support pipe 100 spaced apart from the support rod 200, so that the interference of ultrasonic waves is removed, thereby more accurately measuring the water level.

That is, since the ultrasonic probe 300 is attached to the fixed support rod 200 filling the inside to transmit ultrasonic waves to the support pipe 100 that does not directly contact the ultrasonic probe 300, ultrasonic waves between the ultrasonic probe 300 do not interfere with each other, thereby generating interference signals or noise signals. Therefore, since complicated additional equipment such as an arithmetic processing device for processing the interference signals or noise signals is not required, and each ultrasonic probe 300 independently measures the water level, a simple structure is possible and manufacturing costs can be minimized.

Figure 4:
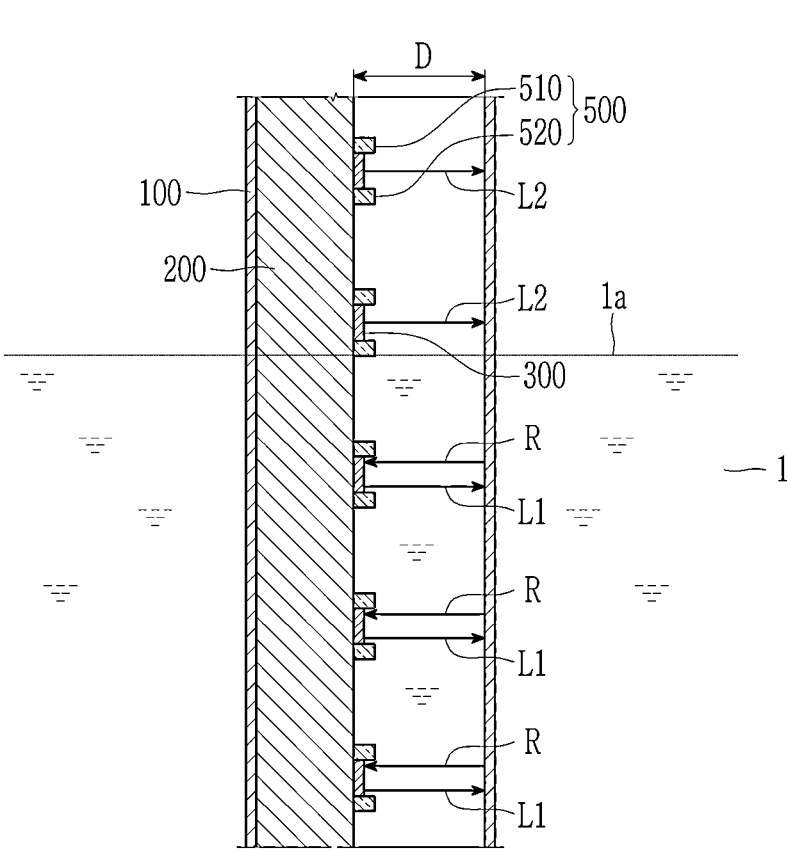
FIG. 4 is a partially enlarged view of a water level measurement system according to an embodiment, and is a drawing illustrating a state in which ultrasonic waves propagate above and below the water surface.

FIG. 4 is a partially enlarged view of a water level measurement system according to an embodiment, and is a drawing illustrating a state in which ultrasonic waves propagate above and below the water surface.

As shown in FIG. 4, since the ultrasonic wave L1 generated by the ultrasonic probe 300 disposed below the water surface 1a propagates inside the fluid 1, a reflected wave may be generated on the inner wall of the support pipe 100, and since the reflected wave R propagates to the ultrasonic probe 300 again, the ultrasonic probe 300 can detect the reflected wave.

In addition, since the ultrasonic wave L2 generated by the ultrasonic probe 300 disposed above the water surface 1a does not propagates inside the fluid 1, it is dissipated or scattered on the inner wall of the support pipe 100, so that the ultrasonic probe 300 cannot detect the reflected wave R.

The water level calculator 400 may be connected to the plurality of ultrasonic probes 300 to calculate the water level of the water tank 10. The water level calculator 400 can calculate the water level of the water tank 10 by summing the number of ultrasonic probes 300 that detect the signal of the reflected wave R reflected from the support pipe 100 among the plurality of ultrasonic probes 300.

That is, when the number of the plurality of ultrasonic probes 300 is N, the length of the support rod 200 (or support pipe 100) is L, and the number of ultrasonic probes 300 detecting the signal of the reflected wave R is S, the water level P of the water tank 10 may be expressed by Equation 1 below.

$$P = (L/N)*S \qquad \text{[Equation 1]}$$

At this time, each ultrasonic probe 300 may serve as a channel for measuring the water level. That is, when the water level is to be measured with 100 channels in the water tank 10 filled with the fluid 1 having a water level of 6 m, 100 ultrasonic probes 300 may be installed on the support rod 200 with the length of 6 m, and one ultrasonic probe 300 may be disposed every 6 cm.

In addition, when the water level is to be measured with 150 channels in the water tank 10 having a water level of 4 m, 150 ultrasonic probes 300 may be installed on the support rod 200 with the length of 4 m, and one ultrasonic probe 300 may be disposed every 2.67 cm. At this time, when the number of channels through which the signal of the reflected wave R is detected is 123 channels, the number S of the ultrasonic probes 300 detecting the signal of the reflected wave R becomes 123. Therefore, since the total number N of ultrasonic probes 300 is 150 and the length L of the support rod 200 is 400 cm, the water level P of the water tank 10 may be calculated as (400 cm/150)*123=328.41 cm.

In addition, by increasing the number of channels, that is, the number of the ultrasonic probes 300, the water level of the water tank 10 can be more accurately measured.

As described above, in the water level measurement system according to an embodiment of the present invention, the ultrasonic waves propagate between the support rod 200 and the inner wall of the support pipe 100, which is a space where no bubbles or steam are generated, so that the water level of the fluid 1 filled inside the water tank 10 can be more accurately measured.

In addition, since the water level of the fluid 1 filled in the water tank 10 can be measured using the ultrasonic probe 300, which is a low-cost apparatus, the water level can be quickly measured at a low cost compared to a method using expensive radar-type equipment.

The plurality of fixing members 500 may fix the plurality of ultrasonic probes 300 to the support rod 200. The fixing member 500 may include a first fixing member 510 and a second fixing member 520 respectively installed in contact with the upper and lower surfaces of the ultrasonic probe 300. Since shaking of the ultrasonic probe 300 can be prevented by using the first fixing member 510 and the second fixing member 520, the water level can be more accurately measured by the ultrasonic probe 300.

Although the present disclosure has been described through preferred embodiments as described above, the present invention is not limited thereto and various modifications and variations are possible without departing from the scope of the claims described below. Those in the field will easily understand.

6

The invention claimed is:

1. A water level measurement system comprising:
   a support pipe installed in a water tank filled with a fluid to measure a water level and extending in a depth direction of the water tank;
   a support rod disposed within the support pipe where the water is filled and eccentric with respect to a central axis of the support pipe, the support rod extending in the depth direction of the water tank, wherein an ultrasonic propagation region that inhibits generation of bubbles or steam is formed between the support rod and an inner wall of the support pipe;
   a plurality of ultrasonic probes attached to a lateral surface of the support rod facing a far-side of the inner wall of the support pipe and configured to emit ultrasonic waves in a horizontal direction toward the inner wall of the support pipe and detect ultrasonic waves reflected back from the inner wall of the support pipe, and
   a water level calculator connected to the plurality of ultrasonic probes and calculating the water level of the water tank,
   wherein a number of the ultrasonic probes submerged in the water varies depending on the water level.

2. The water level measurement system of claim 1, wherein
   the support rod is in contact with the inner wall of the support pipe.

3. The water level measurement system of 1, wherein
   the water level calculator calculates the water level of the water tank by using a number of ultrasonic probes that detect signals of reflected waves reflected back from the inner wall of the support pipe among the plurality of ultrasonic probes.

4. The water level measurement system of 3, wherein
   when the number of the plurality of ultrasonic probes is N, a length of the support rod is L, and the number of ultrasonic probes detecting the signal of the reflected wave is S, the water level of the water tank is calculated as (L/N)*S.

5. The water level measurement system of 1, wherein
   the plurality of ultrasonic probes are disposed in the depth direction of the water tank.

6. The water level measurement system of 1, further comprising
   a fixing member fixing the ultrasonic probe to the support rod.

7. The water level measurement system of 1, wherein
   the water tank includes a nuclear fuel reloading tank or a nuclear fuel storage tank of a nuclear power plant.

* * * * *